(12) United States Patent
Fields et al.

(10) Patent No.: US 6,565,955 B2
(45) Date of Patent: May 20, 2003

(54) BRIGHT INDIUM-METALLIZED FORMABLE FILM LAMINATE

(75) Inventors: Thomas R. Fields, Charlotte, NC (US); Don Smith, Matthews, NC (US); Quan Song, Matthews, NC (US); Mark O. Outlaw, Charlotte, NC (US); Kenneth W. Dick, San Ramon, CA (US)

(73) Assignee: Soliant LLC, Lancaster, SC (US)

( * ) Notice: Subject to any disclaimer, the term of this patent is extended or adjusted under 35 U.S.C. 154(b) by 0 days.

(21) Appl. No.: 09/882,601

(22) Filed: Jun. 15, 2001

(65) Prior Publication Data

US 2002/0048665 A1 Apr. 25, 2002

Related U.S. Application Data

(63) Continuation-in-part of application No. 09/268,085, filed on Mar. 12, 1999, now Pat. No. 6,287,672.

(51) Int. Cl.⁷ ............................. B32B 15/00; B32B 3/00; B32B 7/00
(52) U.S. Cl. ........................ 428/209; 428/409; 428/421; 428/423.1; 428/500
(58) Field of Search .............................. 428/198, 209, 428/409, 421, 423.1, 500

(56) References Cited

U.S. PATENT DOCUMENTS

| | | |
|---|---|---|
| 4,076,889 A | 2/1978 | Sasaki et al. |
| 4,101,698 A | 7/1978 | Dunning et al. |
| 4,115,619 A | 9/1978 | Kurfman et al. |
| 4,211,822 A | 7/1980 | Kurfman et al. |
| 4,241,129 A | 12/1980 | Marton et al. |
| 4,351,864 A | 9/1982 | Giannakidis |
| 4,403,004 A | 9/1983 | Parker et al. |
| 4,407,871 A | 10/1983 | Eiisfeller |
| 4,431,711 A | 2/1984 | Eisfeller |
| 4,671,985 A | 6/1987 | Rodrigues et al. |
| 4,684,353 A | 8/1987 | deSouza |
| 4,713,143 A | 12/1987 | Eisfeller |
| 4,810,540 A | 3/1989 | Ellison et al. |
| 4,816,324 A | 3/1989 | Berman |
| 4,837,068 A | 6/1989 | Martin et al. |
| 4,875,262 A | 10/1989 | DeGrave |
| 4,877,683 A | 10/1989 | Bragaw, Jr. et al. |
| 4,904,526 A | 2/1990 | Koskenmaki |
| 4,913,760 A | 4/1990 | Benson et al. |
| 4,918,800 A | 4/1990 | Reafler |
| 4,928,908 A | 5/1990 | Horii |
| 4,931,324 A | 6/1990 | Ellison et al. |
| 4,943,680 A | 7/1990 | Ellison et al. |
| 4,952,293 A * | 8/1990 | Sypula et al. ............ 204/180.7 |
| 4,988,540 A | 1/1991 | Bragaw, Jr. et al. |
| 5,024,881 A | 6/1991 | Matucha et al. |
| 5,028,492 A | 7/1991 | Guenin |
| 5,035,940 A | 7/1991 | Winton et al. |
| 5,037,680 A | 8/1991 | Papendick et al. |
| 5,055,346 A | 10/1991 | Rohrbacher |
| 5,118,372 A | 6/1992 | Spahn |
| 5,141,702 A | 8/1992 | Guenin et al. |
| 5,215,826 A | 6/1993 | Shimanski et al. |
| 5,284,679 A | 2/1994 | Eisfeller |
| 5,320,869 A | 6/1994 | Eisfeller et al. |
| 5,342,666 A | 8/1994 | Ellison et al. |
| 5,353,154 A | 10/1994 | Lutz et al. |
| 5,384,161 A | 1/1995 | Eisfeller et al. |
| 5,418,056 A | 5/1995 | Noguchi et al. |
| 5,514,427 A | 5/1996 | Ellison et al. |
| 5,518,786 A | 5/1996 | Johnson et al. |
| 5,532,045 A | 7/1996 | Wade |

(List continued on next page.)

FOREIGN PATENT DOCUMENTS

| | | |
|---|---|---|
| JP | 62 156942 A | 7/1987 |
| JP | 03 225322 A | 10/1991 |
| JP | 03 296769 A | 12/1991 |
| WO | WO 99/33649 A1 | 7/1999 |
| WO | WO 00/73061 A2 | 12/2000 |

OTHER PUBLICATIONS

DuPont®, Tedlar® Polyvinyl Fluoride Film Technical Information, *General Properties*, 4 pages, Printed in U.S.A. Oct. 1995.

DuPont®, Tedlar® Polyvinyl Fluoride Film Product Information, *Adhesive and Lamination Guide for Tedlar® PVF Film*, 10 pages, Printed in U.S.A. Oct. 1995.

DuPont®, Tedlar® Polyvinyl Fluoride Film Technical Information, *Flexible Product Adhesive for Use with Tedlar® Polyvinyl Flouride Film*, 2 pages, Printed in U.S.A. Oct. 1995.

DuPont®, Tedlar® SP Polyvinyl Fluoride Film Technical Information, *Lamination Guide*, 4 pages, Printed in U.S.A. Feb. 1999.

DuPont®, Tedlar® SP Polyvinyl Fluoride Film Technical Information, *Properties and Maintenance of High–Gloss Tedlar® SP Film in Laminate Applications*, 4 pages, Printed in U.S.A. Apr. 1997.

DuPont®, Tedlar® Polyvinyl Fluoride Film Technical Information, *Chemical Properties, Optical Properties, and Weatherablity Performance*, 4 pages, Printed in U.S.A. Oct. 1995.

*Primary Examiner*—Cynthia H. Kelly
*Assistant Examiner*—B. Shewareged
(74) *Attorney, Agent, or Firm*—Kennedy Covington Lobdell & Hickman, LLP

(57) ABSTRACT

A bright metallized formable film laminate having excellent optical and deformation properties. The bright metallized formable film laminate preferably includes a formable, weatherable clear coat film comprising polyvinylidene difluoride, a formable clear coat leveling layer on the weatherable clear coat film, and a discontinuous layer of indium islands deposited on the formable leveling layer, opposite said weatherable clear coat film. Also disclosed are methods of making such bright metallized formable film laminates.

75 Claims, 5 Drawing Sheets

U.S. PATENT DOCUMENTS

| | | |
|---|---|---|
| 5,536,539 A | 7/1996 | Ellison et al. |
| 5,653,927 A | 8/1997 | Flynn et al. |
| 5,684,633 A | 11/1997 | Lutz et al. |
| 5,688,598 A | 11/1997 | Keck et al. |
| 5,707,697 A | 1/1998 | Spain et al. |
| 5,711,993 A | 1/1998 | Lein et al. |
| RE35,739 E | 2/1998 | Ellison et al. |
| 5,725,712 A | 3/1998 | Spain et al. |
| 5,738,934 A | 4/1998 | Jones |
| 5,750,234 A | 5/1998 | Johnson et al. |
| 5,759,727 A | 6/1998 | Halhotra |
| RE35,894 E | 9/1998 | Ellison et al. |
| 5,821,180 A | 10/1998 | Iwata et al. |
| RE35,970 E | 11/1998 | Ellison et al. |
| 5,895,624 A | 4/1999 | Reece et al. |
| 5,916,643 A | 6/1999 | Spain et al. |
| 5,919,537 A | 7/1999 | Niazy |
| 5,960,527 A | 10/1999 | Ellison et al. |
| 5,962,121 A | 10/1999 | Mori |
| 5,968,657 A | 10/1999 | Scullin et al. |
| 5,968,663 A | 10/1999 | Muggli |
| 5,976,671 A | 11/1999 | Gleim |
| 5,985,079 A | 11/1999 | Ellison |
| 5,985,418 A | 11/1999 | Lein et al. |
| RE36,457 E | 12/1999 | Ellison et al. |
| 6,017,639 A | 1/2000 | Higginbotham et al. |
| 6,060,135 A | 5/2000 | Service |
| 6,071,621 A | 6/2000 | Falaas et al. |
| 6,083,335 A | 7/2000 | Scullin et al. |
| 6,083,628 A | 7/2000 | Yializis |
| 6,093,278 A | 7/2000 | Wade |
| 6,113,838 A | 9/2000 | Flynn et al. |
| 6,287,672 B1 * | 9/2001 | Fields et al. ............ 428/209 |

* cited by examiner

BRIGHT INDIUM-METALLIZED FORMABLE FILM LAMINATE

CROSS-REFERENCE TO RELATED APPLICATION

This application is a continuation-in-part of U.S. application Ser. No. 09/268,085, filed Mar. 12, 1999, now U.S. Pat. No. 6,287,672, which is herein incorporated by reference in its entirety.

FIELD OF THE INVENTION

The invention relates to bright film technology. In particular, the invention is a bright metallized formable film laminate that has superior optical and deformation properties. In a preferred embodiment, the formable film laminate includes a layer of discontinuous indium islands deposited on a polyvinylidene difluoride film. The invention is also an improved method of making bright metallized film laminates.

BACKGROUND OF THE INVENTION

Metallized polymeric finishes can be used to complement and even replace bright, reflective metal surface treatments, particularly chrome plating. Polymeric structures having metallized finishes are commonly used as substitutes for articles, such as automobile grills, that are expected to have a chrome-plated appearance. Decorative polymeric components, in fact, are becoming standard in the automobile industry, primarily because plastics are relatively flexible, corrosion-resistant, and inexpensive. Plastic parts also reduce vehicle weight, which enhances performance, especially fuel economy.

Many patents disclose metallized substrates. For example, U.S. Pat. No. 5,035,940, for an Aluminum-Fluoropolymer Laminate describes a polymer-backed aluminum substrate with a weather-resistant polymer coating. Similarly, U.S. Pat. No. 5,536,539, for an Injection Molded Plastic Article with Integral Weatherable Pigmented Film Surface describes an automotive component formed from a molded polymer article having a decorative polymeric film surface. Both of these patents are commonly-assigned with the present invention.

As will be known by those familiar with the metallizing arts, chrome plating is perhaps the most common method of metallizing three-dimensional substrates, such as injection-molded substrates. Unfortunately, chrome plating not only carries onerous environmental concerns, but also introduces possible human health hazards.

A better method of metallizing polymeric substrates is to coat metal onto molded substrates, usually by vacuum deposition. In this regard, indium has gained acceptance as a preferred metal because on a microscopic scale it tends to form small, discrete deposits or "islands." When bent or flexed, discontinuous metal layers tend to retain the desired optical properties better than do continuous metal films, which tend to fracture. Discrete metallization also minimizes electrical conductivity, which can hasten unwanted corrosion. For example, U.S. Pat. No. 4,431,711, for Vacuum Metallizing a Dielectric Substrate with Indium and Products Thereof addresses indium metallizing three-dimensional articles in a way that minimizes electrical conductivity and, consequently, corrosion.

In most cases, the metallized layer is covered with a transparent polymeric coating that physically and chemically protects its surface—a so-called "clear coat." Although in-situ metallization of formed polymeric articles is useful, it requires separate applications of a base coat, a metallized layer, and a clear coat. This necessitates drying time for each application, which lengthens the processing times (and hence costs) associated with metallizing three-dimensional articles. Therefore, depositing metal directly onto an article only after the article has been formed can be disadvantageous.

Alternatively, metallized film laminates (i.e., adhesive tapes) that can be applied to polymeric structures offer certain advantages over conventional in-situ metallization techniques. For example, metallized film laminates can be manufactured, stored, and shipped in roll form. Such laminates also facilitate customized application, limited only by adhesive effectiveness. Moreover, using a metallized film laminate reduces chemical compatibility problems that can arise between the metal and the polymeric substrate when metallizing articles in-situ.

To manufacture a metallized film laminate, a polymeric substrate is typically coated with a desired metal, often via vacuum deposition. Then, a polymeric clear coat is added to the metallization layer using conventional techniques, such as casting or doctor-blade applications. Using such metallized film laminates, though convenient, can result in an inferior finish as compared to that obtained by in-situ techniques. Therefore, it is desirable to achieve a finish similar to an in-situ process, yet with the convenience of a film laminate.

To that end, there are known to be metallized laminates that can be formed into desired shapes using conventional techniques. In addition, such molded laminates can be filled with thermoplastic polymer to produce a solid article having a similar bright finish as an article that has been metallized by in-situ methods.

For example, U.S. Pat. No. 4,101,698, for Elastomeric Reflective Metal Surfaces discloses a metallized elastomeric laminate that can provide a reflective metal surface finish for three-dimensional contoured shapes. In particular, the metallized layer is applied to an elastomeric film in separate, discontinuous planar segments. U.S. Pat. No. 4,115,619, for Highly Reflective Multilayer Metal/Polymer Composites discloses a bright multi-layer polymer composite formed by metallizing a thermoplastic polymer layer with a soft metal, such as indium. The metal layer is applied by conventional techniques, such as vacuum deposition, sputtering, or lamination. The metallized film can then be molded into a desired shape using conventional forming processes. U.S. Pat. No. 4,403,004, for a Sandwich Metalized Resin Laminate describes a metallized laminate formed of a thermoformable base layer that is coated on both sides with vapor deposited metal. This laminate is capable of being thermoformed to assume three-dimensional shapes.

Such formable film laminates have poor flexibility, however, often cracking when the metallized substrates are excessively deformed. Moreover, such moldable films tend to lose luster over time. This is particularly pernicious with respect to metallized indium layers, which in the presence of halogen-containing polymers (e.g., polyvinyl chloride) can undergo an oxidation-reduction reaction that converts elemental indium to indium trichloride. Finally, to the extent such moldable films are formed from continuous metallized layers, corrosion problems result.

Accordingly, a need continues to exist for a bright metallized formable film laminate that addresses these problems.

OBJECT AND SUMMARY OF THE INVENTION

Therefore, it is an object of the present invention to provide a bright metallized formable film laminate having superior optical and deformation properties, and a method of making such formable film laminates.

In one broad aspect, the invention is a bright metallized formable laminate made of a discontinuous layer of indium islands deposited on a microscopically-smooth surface of a clear coat polyvinylidene difluoride (PVDF) film. In preferred embodiments, the polyvinylidene difluoride film is formed of an alloy containing polyvinylidene difluoride and an acrylate ("acrylic") polymer. An especially desirable, weatherable polyvinylidene difluoride film is the FLUO-REX® fluoropolymer film (Rexam, Inc.; Matthews, N.C.) that includes about 50 percent acrylic. This indium-FLUOREX® film combination has superior, quantifiable optical and deformation properties as compared to other bright formable films.

In another aspect, the invention includes an adhesive layer placed on the surface of the discontinuous indium layer, opposite the polyvinylidene difluoride film. A thermoplastic backing layer is then placed on the adhesive, opposite the discontinuous indium layer.

In yet another aspect, a formable leveling layer may be included between the discontinuous indium layer and the polyvinylidene difluoride film. In one preferred embodiment, the leveling layer includes polyurethane. In another preferred embodiment, the leveling layer includes polyvinyl fluoride.

In still another aspect, the invention includes an extensible mask layer—preferably polyurethane—that is placed on the polyvinylidene difluoride film, opposite the discontinuous indium layer. The extensible mask layer helps to maintain gloss when the indium-metallized polyvinylidene difluoride film is stretched.

In another broad aspect, the invention is a method of making bright metallized formable laminates that include a discontinuous layer of indium islands deposited on a microscopically-smooth surface of a polyvinylidene difluoride film.

One preferred method includes casting a polyvinylidene difluoride film onto a polymeric substrate—preferably polyethylene terephthalate—and then depositing a discontinuous layer of indium islands onto the polyvinylidene difluoride film. A polymeric film—also preferably polyethylene terephthalate—is placed onto the discontinuous indium layer, and then the polyvinylidene difluoride film and the discontinuous indium layer are "press polished." Alternatively, the polyvinylidene difluoride film may be press polished before the addition of the discontinuous indium layer.

Thereafter, the polymeric film may be removed from the discontinuous indium layer and an adhesive layer and a thermoplastic backing layer may be bonded to the discontinuous indium layer, opposite the polyvinylidene difluoride film, such that the adhesive layer is contiguous to the discontinuous indium layer.

Moreover, the polymeric substrate may be removed from the polyvinylidene difluoride film, and an extensible masking layer may be added to the polyvinylidene difluoride film, opposite the discontinuous indium layer. The extensible masking layer maintains laminate gloss during forming processes.

Another preferred method includes placing a formable leveling layer on the polyvinylidene difluoride film such that the discontinuous indium layer is directly deposited on the leveling layer rather than on the polyvinylidene difluoride film. Use of a leveling layer can eliminate the need for press polishing the polyvinylidene difluoride.

The foregoing, as well as other objectives and advantages of the invention and the manner in which the same are accomplished, is further specified within the following detailed description and its accompanying drawings.

DETAILED DESCRIPTION OF THE INVENTION

Figure 1:
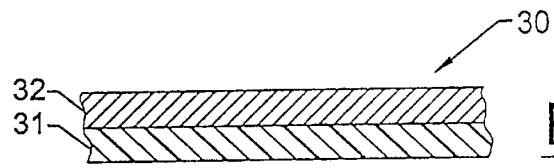
FIGS. 1–4 are schematic cross-sectional views of several embodiments of bright metallized formable film laminate according to the present invention.

In a broad aspect, the invention is a bright metallized formable film laminate made of a discontinuous layer of indium islands deposited on a polyvinylidene difluoride film. In a preferred embodiment, the discontinuous layer of indium islands is deposited upon a microscopically-smooth surface of the polyvinylidene difluoride film.

In another preferred embodiment, the bright metallized formable film laminate includes a formable, weatherable clear coat film comprising polyvinylidene difluoride, a formable clear coat leveling layer on the weatherable clear coat film, and a discontinuous layer of indium islands deposited on the formable leveling layer, opposite the weatherable clear coat film.

In yet another preferred embodiment, the bright metallized formable film laminate includes a formable, weatherable clear coat film comprising polyvinylidene difluoride and acrylic, an acrylic primer layer contiguous to the weatherable clear coat film, a formable clear coat leveling layer contiguous to the acrylic primer layer, opposite the weatherable clear coat film, and a discontinuous layer of indium islands contiguously deposited on the formable leveling layer, opposite the acrylic primer layer. The clear coat leveling layer preferably comprises polyvinyl fluoride having a microscopically-smooth surface contiguous to the discontinuous indium layer.

In another broad aspect, the invention is a method of making bright metallized formable film laminates that include a discontinuous layer of indium islands deposited on a polyvinylidene difluoride film.

In one preferred embodiment, the method includes applying a formable clear coat leveling layer to a formable, weatherable clear coat film—preferably including polyvinylidene difluoride—and depositing a discontinuous layer of indium islands upon the formable clear coat leveling layer, opposite the weatherable clear coat film.

This preferred method can further include applying a primer layer—preferably including acrylic—to either the formable leveling layer or the weatherable clear coat film such that the application of the formable leveling layer to the weatherable clear coat film results in the primer layer being contiguously positioned between the formable leveling layer and the weatherable clear coat film.

Moreover, in another preferred embodiment, the method employs a formable clear coat leveling layer that includes polyvinyl fluoride and has a first surface to which a primer layer is bonded and a second surface that is microscopically smooth. This method includes bonding the primer layer (and thus the formable leveling layer) to a formable, weatherable clear coat film that comprises polyvinylidene difluoride and acrylic. The method also includes depositing a discontinuous layer of indium islands upon the second surface of the formable leveling layer, opposite the primer layer.

It will be appreciated by those of ordinary skill in the art that, as used herein, the concept of a layer being positioned on another layer, or being "between" two other layers does not necessarily imply that the layers are contiguous (i.e., in intimate contact). Rather, as used herein, the concept of a layer being positioned on another layer or between two other layers is meant to describe the relative positions of the layers within the laminate structure. Similarly, as used herein, in a description of a first layer being in contact with or contiguous to a second layer, "opposite" a third layer, the term "opposite" is intended to disclose the relative positions of the first and second layers within the laminate structure.

As used herein, the phrase "microscopically smooth" means that the metallized surface is sufficiently smooth to provide a metallized film having excellent optical clarity (i.e., appearing mirror-like). For example, Rexam's FLUOREXe® film, a polyvinylidene difluoride-containing film, is considered microscopically smooth at a roughness average of 0.75 micron or less. As known to those familiar with microscopic surfaces, the roughness average is the arithmetic average of the absolute values of the deviations of the roughness profile from the mean profile (i.e., "the arithmetic average of all departures of the roughness profile from the mean line"). See U.S. Pat. No. 4,875,262 for a Process for Manufacturing a Grain Chill Roller, at column 3, lines 26–31.

It will be further understood by those skilled in the art that, to the viewer, the discontinuous layer of indium islands according to the present invention appears to be a continuous metal layer. In other words, the viewer integrates the overall appearance of the discontinuous layer of indium islands and sees a bright film. Vapor deposition and sputtering are conventional methods for achieving the discontinuous layer of indium islands. See Wasa and Hayakawa, *Handbook of Sputter Deposition Technology* (1992). These techniques are well known and will not be further described herein.

As described herein, reference to a formable, weatherable clear coat film comprising polyvinylidene difluoride, (herein referred to as the "clear coat PVDF film"), will be understood by those of skill in the art to include polymer blends, alloys, or copolymers in which polyvinylidene difluoride is a significant component. In particular, the present invention can be successfully practiced using a weatherable clear coat film that includes between about 30 and 90 weight percent polyvinylidene difluoride and between about 10 and 70 weight percent acrylic, preferably between about 50 and 70 weight percent polyvinylidene difluoride and between about 30 and 50 weight percent acrylic, and most preferably about 50 weight percent polyvinylidene difluoride and about 50 weight percent acrylic.

The acrylic component of the weatherable clear coat film is typically polymethyl methacrylate (PMMA) or polyethyl methacrylate (PEMA), with others useful as well. In general, higher acrylic percentages provide gloss, as well as greater scratch and mar resistance, but at the cost of less chemical resistance (especially to solvents) and some increased brittleness. A suitable acrylic is ELVACITE 2041, which is available from INEOS Acrylics. A suitable polyvinylidene difluoride polymer is KYNAR 500, which is available from Atofina Chemicals.

As herein disclosed, the thickness of the clear coat PVDF film is typically about 1–2 mil, or about 25–50 microns, and the discontinuous indium layer is typically about 100–800 angstroms, or less than 0.1 micron. The inventors have discovered that the use of a microscopically-smooth, clear coat PVDF film in combination with discontinuous indium islands leads to a synergistic result. In particular, polyvinylidene difluoride and acrylic provide a superior polymer alloy in obtaining a bright metallized laminate that has improved optical and deformation properties. Furthermore, the PVDF-acrylic forms an exceptionally weatherable clear coat.

It will be understood by those skilled in the art that clear coat PVDF films may be available in different colors. Accordingly, the metallized films described herein may be made in various colors by incorporating appropriately tinted clear coat PVDF films. Such films may be tinted, for example, using pigments, inks, or mica, and such can be added as desired without undue experimentation.

Moreover, the indium-metallized clear coat PVDF films may be accentuated with designs, such as patterns, graphics, and even holograms. Such designs are preferably imprinted onto a clear coat layer. For example, ink patterns and graphics may be printed onto any clear coat layer, or a texture, such as a matte finish, may be embossed into the outermost, weatherable clear coat film.

As noted, in a preferred embodiment the bright metallized formable laminate of the present invention preferably includes a thermoplastic leveling layer positioned between the clear coat PVDF film and the discontinuous indium layer. The thickness of the leveling layer is typically between about 0.5 and 1.0 mil (or about 10 to 25 microns).

It will be understood by those of skill in the art that the leveling layer should be a clear coat so that the discontinuous layer of indium islands is not obscured. In this regard, the formable clear coat leveling layer preferably includes acrylic, polyurethane (e.g., Stahl's SU6729), or polyvinyl fluoride (e.g., DuPont's TEDLAR).

Without being bound to a particular theory, it is believed that during heating operations, such as forming processes that demand higher stretch, the formable leveling layer keeps the clear coat PVDF film and the discontinuous indium layer from microscopically wrinkling.

The term "forming" is used herein in a broad sense and can include various, relatively specific techniques that include, but are not limited to, injection molding, thermoforming, blow molding, compression molding, vacuum forming, and "in-mold" forming (e.g., concurrent filling and forming), as well as any other modified or related techniques (e.g., extrusion lamination) that take advantage of the thermoplastic nature of the polymer portions of formable films of the present invention.

Likewise, the term "microscopically wrinkling" is used herein to mean folds in the polyvinylidene difluoride film having an amplitude of less than about 0.5 micron, or about two percent of the film thickness. In particular, the formable leveling layer maintains the metallized laminate's superior distinctness of image (DOI), upwards of 95 DOI. As used herein, distinctness of image is a measure of the optical quality of a reflective surface. DOI is measured using a DOI meter, such as the $I^2R$ Glow Box Model GB11-86M from Instruments for Research and Industry (Cheltenham, Pa.).

The formable clear coat leveling layer preferably includes a microscopically-smooth surface contiguous to the discontinuous indium layer to facilitate optical clarity in the bright metallized laminate. That is, the discontinuous layer of indium islands is deposited upon the microscopically-smooth surface of a formable leveling layer. In this regard, it is believed that a roughness average of about 0.75 micron or less constitutes microscopic smoothness with respect to the formable clear coat leveling layer.

Preferably, the formable clear coat leveling layer and the discontinuous indium layer are bonded together at an adhesion strength (i.e., peel strength) of at least about two pounds per inch as measured essentially according to ASTM Method 1876 (Peel Resistance of Adhesives). In particular, ASTM Method 1876 is modified to determine the peel strength over two inches after implementing a 180° peel at four in/min rather than the peel resistance over five inches after implementing a 90° T-peel at 10 in/min.

Moreover, the bright metallized formable laminate may also include a primer layer, which functions as an adhesion promoter (i.e., an adhesive), between the formable, weatherable clear coat film and the formable clear coat leveling layer. In this regard, the primer layer may be applied to either the clear coat leveling layer or the weatherable clear coat film.

In preferred laminate structures, the primer layer is contiguous to the weatherable clear coat film and the formable leveling layer, and the formable leveling layer is contiguous to the primer layer and the discontinuous indium layer. As will be understood by those of skill in the art, the clear coat PVDF films preferred in practicing the present invention bond only with difficulty to other polymeric materials. The primer layer functions to bond the formable clear coat leveling layer to the weatherable clear coat PVDF film. Acrylic compounds containing about two percent epoxy are satisfactory primers, as are chlorinated polyolefins. Preferred primers are DuPont's amine-containing epoxy acrylics (e.g., 68040, 68070, and 68080), especially used in conjunction with a polyvinyl fluoride clear coat leveling layer.

As noted, one especially preferred embodiment of the bright metallized formable film laminate includes a formable, weatherable clear coat film comprising polyvinylidene difluoride and acrylic (e.g., Rexam's FLUOREX® film), an acrylic primer layer contiguous to the weatherable clear coat film, a formable clear coat leveling layer contiguous to the acrylic primer layer, opposite the weatherable clear coat film, and a discontinuous layer of indium islands contiguously deposited on the formable leveling layer, opposite the acrylic primer layer. The clear coat leveling layer preferably comprises polyvinyl fluoride having a microscopically-smooth surface that is contiguous to the discontinuous indium layer. A similar, preferred embodiment of the bright metallized formable film laminate employs a polyurethane clear coat leveling layer instead of a polyvinyl fluoride clear coat leveling layer.

Note that polyvinyl fluoride film, such as DuPont's TEDLAR film, is commercially available with pre-applied adhesives that facilitate the bonding of the polyvinyl fluoride film to various substrates. In this regard, DuPont's TEDLAR film having a pre-applied acrylic adhesive may be employed as the clear coat leveling layer and the acrylic primer layer, respectively. A polyvinyl fluoride film having a pre-applied acrylic adhesive can be laminated to the clear coat PVDF film, or the clear coat PVDF film can be coated upon the layer of acrylic adhesive that is pre-applied to the polyvinyl fluoride film.

Finally, the formable metallized film described herein may be made in a particular color by incorporating an appropriately tinted leveling layer or primer layer. Moreover, as discussed previously, the leveling layer, which is preferably a clear coat, may be imprinted with a design.

The bright metallized formable film can further include an adhesive layer positioned on the discontinuous indium layer, opposite the clear coat PVDF film, and a thermoplastic substrate layer placed on the adhesive layer, opposite the discontinuous indium layer. The thermoplastic substrate layer, (hereafter referred to as the "thermoplastic backing layer"), typically serves as a backing for the completed metallized laminate film.

Preferably, the adhesive layer is bonded (e.g., via coating or lamination) to the discontinuous indium layer such that it is contiguous to both discontinuous indium layer and the thermoplastic backing layer. Thus, when a clear coat leveling layer is included, the adhesive layer is bonded to the surface of the discontinuous indium layer such that the discontinuous indium layer is sandwiched between the clear coat leveling layer and the adhesive layer. Alternatively, when a clear coat leveling layer is excluded, the adhesive layer is bonded to the surface of the discontinuous indium layer such that the discontinuous indium layer is sandwiched between the clear coat PVDF film and the adhesive layer.

The adhesive layer prevents the undesirable formation of indium oxide ($In_2O_3$), a whitish, unreflective compound. Moreover, when the thermoplastic backing layer includes polyvinyl chloride, the adhesive layer helps to prevent chloride ion or hydrochloric acid from reacting with the indium layer to form indium trichloride ($InCl_3$), an unreflective compound. Adhesives comprising acrylic or chlorinated polyolefin are preferred. Adhesives comprising polyurethane are most preferred.

More generally, the adhesive layer preferably comprises a pressure-sensitive adhesive (e.g., GELVA 2591), a heat-reactive adhesive (e.g., ELVACITE 2009 and ELVACITE 2042), or a crosslinking adhesive system (e.g., NOVACOTE 120A). In this regard, it will be understood by those skilled in the art that heat-reactive adhesives are typically thermoplastic adhesives, whereas crosslinking adhesives are typically thermoset adhesives.

The adhesive layer may also comprise a composite adhesive (i.e., a multicomponent adhesive). As used herein, the terms "composite adhesive" and "multicomponent adhesive" refer to an adhesive formed from blends of polymers or distinct polymer layers (e.g., including an adhesive primer layer). In general, polyurethane adhesives and adhesives including polyurethane have been found to perform exceptionally well. Such adhesives, including acrylic/polyurethane adhesive blends, may be coated onto the discontinuous indium layer using conventional techniques.

As will be understood by those skilled in the art, adhesives are typically added to the laminate structure via coating processes. Alternatively, placement of the adhesive layer onto the discontinuous indium layer may sometimes be facilitated by first forming a multicomponent, adhesive composite. For example, a composite adhesive is advantageous if a thermoplastic layer within the metallized laminate is incapable of withstanding the heated drying (i.e., curing) of the adhesive components or if the clear coat films are susceptible to attack by a solvent present in the adhesive (i.e., the adhesive solvent).

Accordingly, the adhesive solvents and clear coats should be chosen for compatibility. Preferably, the adhesive solvent should be a non-solvent with respect to the clear coat film. Otherwise, the adhesive solvent tends to cause a hazy appearance in the metallized laminate. Even so, an adhesive layer may be achieved by coating the surface of the discontinuous indium layer with an adhesive that includes an adhesive solvent that is also a solvent with respect to the clear coat film, provided that the adhesive solvent is evaporated quickly enough so as not to damage the formable clear coat film or the discontinuous indium layer.

For example, toluene, which is an aggressive solvent to polyvinylidene difluoride/acrylic alloys, may be suitable in forming adhesive layers provided it is evaporated before it can attack the PVDF/acrylic clear coat film. (Polyvinyl fluoride clear coat leveling layers tend to be more chemical resistant than some PVDF/acrylic clear coat films.) To prevent hazing in the clear coat PVDF/acrylic film, the adhesive is preferably a water-based or alcohol-based liquid adhesive that may be coated upon the discontinuous indium layer.

Alternatively, as noted, a multicomponent adhesive may be formed on a polymeric adhesive carrier substrate before the adhesive layer is bonded to the discontinuous indium layer. This kind of adhesive composite formation is yet another aspect of the invention.

One preferred multicomponent adhesive includes a polyurethane layer and an acrylic layer, wherein the polyurethane layer is positioned between the discontinuous indium layer and the acrylic layer of the adhesive layer. In this regard, the acrylic adhesive layer improves laminate processing, but is otherwise unnecessary to the resulting bright metallized laminate. A suitable heat-reactive, thermoplastic acrylic adhesive is DuPont's 68070. Likewise, a suitable polyurethane adhesive is Stahl's SU26-249. As further described herein, this particular multicomponent adhesive is especially suitable with acrylonitrile-butadiene-styrene backing layers.

In preferred embodiments, the polyurethane layer is contiguous to the discontinuous indium layer and the acrylic layer is contiguous to the thermoplastic backing layer. In other words, the polyurethane layer of the adhesive layer is sandwiched between the discontinuous indium layer and the acrylic layer of the adhesive layer. Likewise, the acrylic layer of the adhesive layer is sandwiched between the thermoplastic backing layer and the polyurethane layer of the adhesive layer.

This particular multicomponent adhesive is preferably formed by depositing an acrylic adhesive onto a polymeric adhesive carrier substrate, preferably polyester. Then, a polyurethane adhesive layer is deposited onto the acrylic adhesive layer, opposite the adhesive carrier substrate (i.e., the acrylic adhesive layer is sandwiched between the adhesive carrier substrate and the polyurethane adhesive layer). This creates a kind of pre-formed adhesive composite, which includes a polyurethane adhesive layer and an acrylic adhesive layer and which may then be bonded to the discontinuous indium layer such that the polyurethane adhesive layer is adjacent to the discontinuous indium layer. Thereafter, the polymeric adhesive carrier substrate can be removed from the acrylic adhesive layer, thereby leaving in place the composite adhesive layer.

Another multicomponent adhesive includes a polyurethane layer, an acrylic layer, and a chlorinated polyolefin layer, wherein the polyurethane layer is positioned between the discontinuous indium layer and the acrylic layer, and the acrylic layer is positioned between the polyurethane layer and the chlorinated polyolefin layer. As further described herein, this multicomponent adhesive is especially suitable with thermoplastic olefin backing layers.

Yet another multicomponent adhesive includes a layer made of an acrylic/polyurethane blend, and a chlorinated polyolefin layer, wherein the acrylic/polyurethane layer is positioned between the discontinuous indium layer and the chlorinated polyolefin layer. As further described herein, this multicomponent adhesive is also especially suitable with thermoplastic olefin backing layers.

After the adhesive layer is bonded to the discontinuous indium layer (and any adhesive carrier substrate is removed), a thermoplastic backing layer can be positioned upon the adhesive layer using conventional processes (e.g., heat laminating) known by those of skill in the art. With respect to the thermoplastic backing layer, many conventional thermoplastics perform satisfactorily. Certain kinds of thermoplastics, however, are preferred. In particular, the present invention is best practiced by employing a thermoplastic backing layer made from polyvinyl chloride (PVC), thermoplastic olefins (TPO), acrylonitrile-butadiene-styrene copolymers (ABS), polycarbonates, polystyrene, polyamide polymers (e.g., nylons), polyethylene, polypropylene, and copolymers and blends of these polymeric compositions. (For example, suitable copolymer could include polyethylene and polypropylene.) Most preferably, however, the thermoplastic backing layer includes acrylonitrile-butadiene-styrene copolymers, polyvinyl chloride, or thermoplastic olefins. In this regard, it is preferred that a thermoplastic backing layer formed of either ABS or TPO be corona treated to improve adhesion to the adhesive layer.

In preferred embodiments, the adhesive layer is contiguously positioned on the discontinuous indium layer, opposite the clear coat PVDF film, and the thermoplastic backing layer is contiguously positioned on the adhesive layer, opposite the discontinuous indium layer.

In such contiguous laminate structures, there are combinations of adhesive layers and thermoplastic backing layers that perform exceptionally well. One preferred embodiment includes a polyurethane adhesive layer paired with either a polyvinyl chloride or an acrylonitrile-butadiene-styrene thermoplastic backing layer.

Another preferred embodiment includes a multicomponent adhesive layer formed of a polyurethane layer and an acrylic layer, and an ABS thermoplastic backing layer. In this embodiment, the polyurethane layer is sandwiched between the discontinuous indium layer and the acrylic layer, and the acrylic layer is sandwiched between the polyurethane layer and the ABS thermoplastic backing layer (i.e., the ABS thermoplastic backing layer is contiguous to the acrylic layer).

Yet another preferred embodiment includes a multicomponent adhesive layer formed of a polyurethane layer, an acrylic layer, and a chlorinated polyolefin layer, and a TPO thermoplastic backing layer. In this embodiment, the polyurethane layer is sandwiched between the discontinuous indium layer and the acrylic layer, the acrylic layer is sandwiched between the polyurethane layer and the chlorinated polyolefin layer, and the chlorinated polyolefin layer is sandwiched between the acrylic layer and the TPO thermoplastic backing layer (i.e., the TPO thermoplastic backing layer is contiguous to the chlorinated polyolefin layer).

This multicomponent adhesive is preferably formed by coating polyurethane adhesive onto the surface of the discontinuous indium layer. Meanwhile, an acrylic adhesive layer is deposited onto an adhesive carrier substrate, a chlorinated polyolefin layer is deposited onto the acrylic adhesive layer, opposite the adhesive carrier substrate, and a TPO thermoplastic backing layer is laminated to the chlorinated polyolefin layer, opposite the acrylic adhesive layer. Thereafter, the adhesive carrier substrate is removed from the acrylic adhesive layer and the acrylic adhesive layer is bonded to the polyurethane adhesive layer, opposite the discontinuous indium layer.

Yet another preferred embodiment includes a multicomponent adhesive layer formed of an acrylic/polyurethane layer and a chlorinated polyolefin layer, and a TPO thermoplastic backing layer. In this embodiment, the acrylic/polyurethane layer is sandwiched between the discontinuous indium layer and the chlorinated polyolefin layer, and the chlorinated polyolefin layer is sandwiched between the acrylic/polyurethane layer and the TPO thermoplastic backing layer (i.e., the TPO backing layer is contiguous to the chlorinated polyolefin layer).

This multicomponent adhesive is preferably formed by coating an acrylic/polyurethane adhesive blend onto the surface of the discontinuous indium layer. Meanwhile, a chlorinated polyolefin layer is deposited onto an adhesive carrier substrate and a thermoplastic olefin layer is laminated to the chlorinated polyolefin layer, opposite the adhesive carrier substrate. Thereafter, the adhesive carrier substrate is removed from the chlorinated polyolefin layer and the chlorinated polyolefin layer is bonded to the acrylic/polyurethane adhesive blend, opposite the discontinuous indium layer.

As will be understood by those skilled in the art, the adhesive layer and the thermoplastic backing layer may be tinted (i.e., colored) to provide protection from weathering (e.g., via UV radiation). For example, the adhesive layer (e.g., the polyurethane adhesive layer, the acrylic adhesive layer, or both) or the thermoplastic backing layer may be tinted using pigments, inks, or mica. If tinted, adhesive layers and thermoplastic backing layers are preferably opaque rather than transparent.

The metallized laminate may be formed into metallized articles of manufacture, such as auto parts. In this regard, the presence of a formable clear coat leveling layer ensures that parts formed from the metallized laminate can be successfully injection molded. As will be understood by those of skill in the art, injection molding includes filling the cavity defined by the interior of the formed part with filler material, usually polymeric filler. The metallized laminates may also be die cut using methods that are well known to those of skill in the art.

Additionally, an extensible mask layer may be added to the clear coat PVDF film, opposite the discontinuous indium layer, before forming the metallized laminate. The extensible mask layer is designed to maintain gloss and DOI during thermoforming processes, vacuum forming processes, and molding processes, including injection molding, blow molding, and compression molding. The mask layer also adds strength to the metallized laminate. In particular, the extensible mask layer protects the underlying layers of the metallized laminate from scratching or marring until the formed part is ready for display.

Where high stretch is important, the mask layer is preferably capable of stretching up to about 600 percent during forming and has a room temperature elongation at break of at least about 200 percent (i.e., at between about 15° C. to 30° C.). In this regard, polyurethane mask layers are preferred.

Alternatively, where high stretch is relatively unimportant, the mask layer may include polyethylene terephthalate, PEG-modified polyethylene terephthalate, polyamide polymers (e.g., nylons), polyethylene, polypropylene, and copolymers and blends including these polymers. As used herein, the term "copolymers" broadly embraces a composition produced by the simultaneous polymerization of two or more dissimilar monomers. See *Hawley's Condensed Chemical Dictionary* (12$^{th}$ ed. 1993).

Preferably, the extensible mask layer is pre-formed on a polymeric substrate, such as polyester. The mask layer is placed directly upon the clear coat PVDF film and the polymeric substrate is removed from the mask layer. To facilitate this procedure, the polymeric substrate to which the clear coat PVDF film is weakly bonded must first be removed.

The mask layer may be retained as a protective outer layer while manufacturing articles from the metallized laminate. The extensible mask layer is releasably bonded to the underlying clear coat PVDF film of the metallized laminate and may be stripped away in a single piece to reveal the underlying weatherable clear coat film. In a preferred embodiment, the extensible mask layer is substantially transparent to permit visual inspection for surface defects without having to remove the mask layer.

Additionally, the extensible mask layer maintains high gloss and DOI during injection or compression molding, such as thermoplastic or thermoset compression molding, which employ a roughened or deglossed mold. Roughened molds are functionally superior to highly polished molds, despite being less expensive, because the rough mold surface facilitates air removal from the mold as the mold closes. The extensible mask layer protects the metallized laminate from gloss reduction, or other damage caused by the mold, without using highly polished molds.

The extensible mask layer is typically about 0.3 mils to about 3.0 mils thick, and preferably comprises polyurethane. Preferably, the mask layer comprises a dried film of an aliphatic or an aromatic polyester or polyether polyurethane in the form of a dispersion or a solution. For example, polyurethane polymers QA 5218 and QA 5026, manufactured by Mace Adhesives and Coatings of Dudley, Mass., may be used to form the mask layer. In one embodiment, the mask layer comprises between about 85 and 99.5 weight percent of a water-based, polyurethane dispersion. Advantageously, a small amount of surfactant (between about 0.05 and 0.2 weight percent) is added to lower surface tension. A preferred surfactant is SURFYNOL 104H, which is manufactured by Air Products of Allentown, Pa.

The mask layer composition may include additives that migrate into the clear coat PVDF film to enhance weatherability or other desirable properties. (Mask layer additives can also prevent migration of additives from the clear coat PVDF film into the extensible mask layer.) Migratory additives suitable for use with the present invention include, but are not limited to, hardness enhancers, release agents, ultraviolet light stabilizers, antioxidants, dyes, lubricants, surfactants, catalysts, and slip additives.

More specifically, the migratory additives useful in the present invention include benzophenone, silicones, waxes, triazoles, triazines, and combinations of these additives. The migratory additives are forced to migrate into the outer surface of the clear coat PVDF film by the heat or pressure present during forming or molding processes. Additionally, the presence of these additives in the mask layer prevents migration of additive components from the clear coat PVDF film into the mask layer.

Ultraviolet light stabilizers, such as TINUVIN 1130 and TINUVIN 292, both manufactured by Ciba Geigy of Hawthorne, N.Y., can be added to the mask layer composition as migratory additives. Silicone additives, such as BYK333, which is manufactured by BYK Chemie of Wallingford, Conn., can be added to lower the coefficient of friction of the clear coat PVDF film. The migratory additives are generally added in amounts ranging from between about 0.01 and 2.0 weight percent, with all additives typically accounting for no more than about 5.0 weight percent of the mask layer composition.

Even without the extensible mask layer, the metallized laminates herein described are capable of retaining their desirable optical properties even upon undergoing tremendous deformation, including being stretched and die cut in amounts of up to 50–100 area percent while retaining the DOI of 95 or better noted above. This promotes the use of the metallized laminate in additional kinds of forming operations.

In particular, the metallized laminate may be placed over a relatively cooler article such that when the air between the metallized laminate and the article is removed, the metallized laminate will adhere to the contours of the article. This has been found to be effective in forming either male or female parts.

The method includes heating the metallized laminate to a temperature warmer than the surface of an article to which the metallized laminate is to be bonded, placing the metallized laminate upon the article, and creating a vacuum about the article to shape and conform the laminate to the contours of the article. The temperatures at which the forming operations proceed depend largely upon the composition of the thermoplastic backing layer. For example, where PVC or ABS are employed as the thermoplastic backing layer, the metallized laminate should be at a temperature of between 280° F. and 370° F., and the article should be at a temperature of less than about 120° F.

As will be known to those of skill in the art, removal of entrained air may be accomplished by placing the metallized laminate onto the article under reduced pressure conditions (i.e., less than atmospheric pressure). This process reduces iridescence of the formed, metallized film laminate. As will be known by those skilled in the art, iridescence is a rainbow-like display of color that is caused by differential light refraction.

In another broad aspect, the invention relates to improved methods for forming bright metallized laminates. More specifically, the present invention includes novel processing steps not previously disclosed in the prior art.

One such advancement is the step of press polishing a clear coat film to make it microscopically smooth. For example, some clear coat films, such as PVDF-containing films, are microscopically rough. Microscopic roughness reduces the optical clarity of the resulting metallized film. In other words, exceptional smoothness has a favorable impact on the optical properties of molded and unmolded metallized laminates. Press polishing, as hereinafter disclosed, is the process of smoothing at least one surface of a clear coat film.

In one embodiment, press polishing is directed to the clear coat PVDF film, preferably FLUOREX® film, before it is metallized. The clear coat PVDF film is continuously coated onto a polymeric substrate, preferably a polyester substrate, then dried through an oven. As the clear coat PVDF film exits the oven, a polymeric film, preferably a polyester film, is applied to the clear coat PVDF film opposite the polymeric substrate. Then, this structure is continuously pressed between a nip that is formed by two rollers, one or both of which are heated. The polymeric film is thereafter removed to facilitate the indium metallizing of the clear coat PVDF film.

In another embodiment, press polishing is directed to a structure that includes a discontinuous layer of indium islands deposited on a PVDF-containing film. First, the discontinuous indium layer and the clear coat PVDF film are weakly bonded to polymeric materials. More specifically, the clear coat PVDF film is applied to a polymeric substrate, preferably a polyester substrate, opposite the discontinuous indium layer, and a polymeric film, preferably a polyester film, is applied to the discontinuous indium layer opposite the clear coat PVDF film. Then, this polymeric structure, which includes both a discontinuous indium layer and clear coat PVDF film, is fed through a heated nip. Thereafter, the polymeric film is removed from the discontinuous indium layer.

Note, too, that the clear coat PVDF film and the discontinuous indium layer may be press polished despite being separated by either (1) a clear coat leveling layer or (2) a primer layer and a clear coat leveling layer.

Polyester (e.g., polyethylene terephthalate) seems to work best as the polymeric substrate to which the clear coat PVDF film is weakly bonded. Likewise, the inventors have discovered that polyester seems to work best as the polymeric film that is placed upon the discontinuous layer of indium islands. In this regard, DuPont's MYLAR D polyester film has a smooth surface quite suitable for the process.

While press polishing is advantageous with respect to clear coat films that are not microscopically smooth, it is unnecessary for clear coat films that are purchased with at least one microscopically-smooth surface and undesirable for clear coat films that are incompatible with press polishing.

For example, DuPont's TEDLAR film, a polyvinyl fluoride film, is commercially available sandwiched between a pre-applied acrylic adhesive and a polyester substrate, and in this form may be employed as a clear coat leveling layer and an acrylic primer layer, respectively. More specifically, the polyvinyl fluoride surface contiguous to the polyester substrate is generally sufficiently smooth to facilitate the making of an optically clear metallized laminate.

Despite DuPont's technical guidance to utilize the acrylic adhesive, it is preferred to remove the polyester substrate and then deposit the discontinuous indium layer directly upon the microscopically-smooth surface of the TEDLAR film itself, rather than upon the adjacent acrylic adhesive layer, which is not acceptably smooth. Preparing an embodiment of the invention in this way provides the opportunity to bond a weatherable clear coat PVDF film, such as Rexam's FLUOREX® film, to the TEDLAR film via the acrylic adhesive. In this regard, numerous acceptable adhesives, such as DuPont's amine-containing epoxy acrylics 68040, 68070, and 68080, are available for use with DuPont's TEDLAR film.

EXAMPLE 1

The bright metallized formable film laminate can be formed using the following steps: depositing a layer of indium at an optical density (OD) of 1.15 on FLUOREX® clear film (Rexam) through vacuum deposition; press polishing by bonding a 1 mil polyethylene terephthalate (DuPont) onto the indium surface through a hot nip (330–380° F.); removing the polyethylene terephthalate from the indium surface; casting a polyurethane adhesive (NOVACOTE ADH 120ASL) onto the indium layer at a dry thickness of 0.5 mil; and then bonding the adhesive to a 20 mil ABS through a nip.

EXAMPLE 2

Preparing, at about 125° F., a PVDF-containing clear coat mixture having a 60/40 weight ratio of polyvinylidene difluoride (Atofina Chemicals KYNAR SL) to acrylic (INEOS Acrylics ELVACITE 2041); providing a polyvinyl fluoride film to which an acrylic adhesive is pre-applied (DuPont TEDLAR SP film); coating the adhesive side of the polyvinyl fluoride film with the PVDF-acrylic clear coat mixture and then drying the PVDF-acrylic clear coat mixture for 2 minutes at 170° F. and 3 minutes at 310° F. to achieve a PVDF/acrylic clear coat having a dry thickness of about 1.0 mil; depositing a layer of indium at an optical density (OD) of 1.4 onto the polyvinyl fluoride film using a DC magnetron sputtering system; coating a polyurethane adhesive layer (NOVACOTE ADH NC120A) onto the indium layer; drying the polyurethane adhesive layer for 2 minutes at 170° F. and 2 minutes at 270° F. to yield a dry thickness of about 0.7 mil; laminating this intermediate structure to a 19-mil, corona-treated ABS film.

Preferred embodiments of the bright metallized formable laminate and the method of making the same are illustrated by the drawings, all of which are cross-sectional and schematic in nature, and are not intended to be drawn to scale, but instead are intended to illustrate the various layers in the films of the invention, the manner in which they are made, and their relationships to one other. For consistency and clarity, each drawing designates the particular layers by the same reference numerals as is practicable.

Accordingly, FIG. 1 shows the broadest embodiment of the invention in the form of a bright metallized formable laminate broadly designated at 30 in which a clear coat PVDF film 31 with microscopically-smooth surfaces has thereon a layer 32 of discontinuous indium islands deposited on the PVDF-containing film. As set forth above, the clear coat PVDF film is most preferably made from a polymer alloy of polyvinylidene difluoride and an appropriate acrylic compound.

Figure 2:
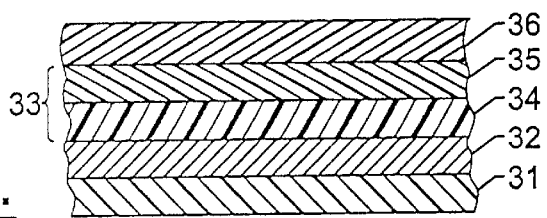

FIG. 2 illustrates that the bright metallized laminate 30 can further include an adhesive layer designated by the brackets 33 in FIG. 2 on the surface of the indium layer 32, opposite the clear coat PVDF film 31. In preferred embodiments, the adhesive layer 33 is formed of a polyurethane layer 34 directly on the discontinuous indium layer 32, and an acrylic layer 35 on the polyurethane layer 34. A thermoplastic backing layer 36 is placed on the adhesive layer 33 to complete the structure for eventual use.

Figure 3:
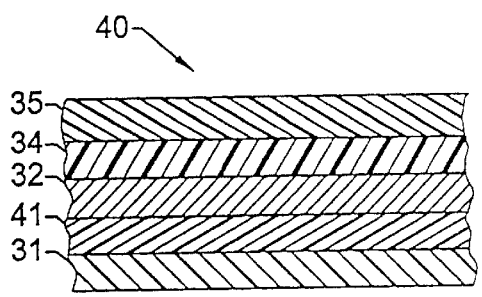

In another embodiment, broadly designated at 40 in FIG. 3, the bright metallized formable laminate 40 includes a clear coat PVDF film 31 and a discontinuous indium layer 32. This embodiment, however, further includes a formable clear coat leveling layer 41 on the clear coat PVDF film 31. Consequently, the discontinuous indium layer 32 is on the formable clear coat leveling layer 41 rather than on the clear coat PVDF film 31. As in the previous embodiments, the metallized laminate 40 preferably includes the adhesive layer formed by the respective polyurethane layer 34 and acrylic layer 35.

Figure 4:
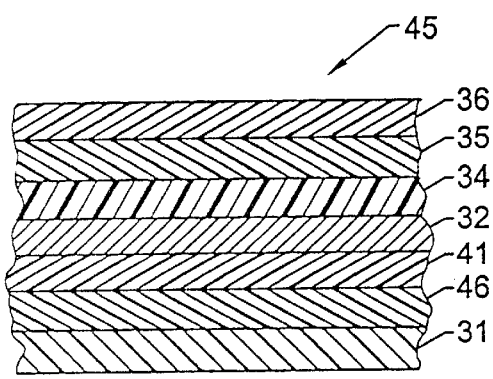

FIG. 4 shows an embodiment of the invention, which is related to that of FIG. 3 and which is broadly designated at 45, that further includes a primer layer 46 between the clear coat PVDF film 31 and the formable clear coat leveling layer 41. As in the embodiment illustrated in FIG. 3, the discontinuous indium layer 32 is on the formable clear coat leveling layer 41, and the adhesive layer formed from the polyurethane layer 34 and the acrylic layer 35, respectively, is on the discontinuous indium layer 32. FIG. 4 also depicts a thermoplastic backing layer 36 on the adhesive layer.

Figure 5:
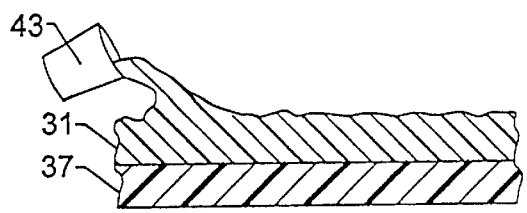
FIGS. 5–11 illustrate the sequence for forming one embodiment of the bright metallized formable film laminate of the present invention.
Figure 6:
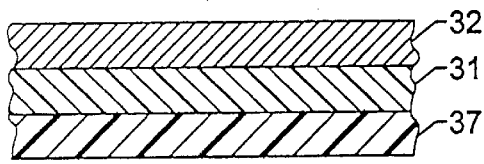
Figure 7:
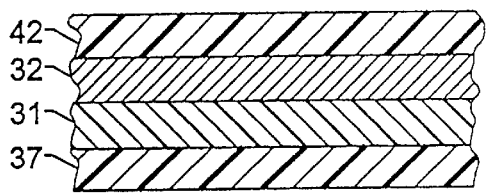
Figure 8:
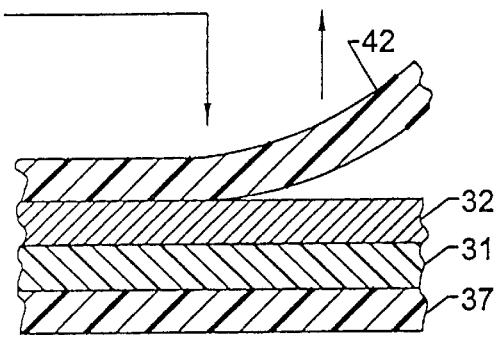

FIGS. 5–11 illustrate a first embodiment of a method of making the bright metallized formable laminate of the present invention. Accordingly, FIG. 5 shows that in a first step, a PVDF-acrylic composition is cast from an appropriate casting source schematically illustrated at 43, onto a polymeric substrate 37, preferably comprising polyester, to form a clear coat PVDF film 31. Suitable casting methods include a knife-over roll coating process, a reverse roll coating process, or preferably, a slot die coating process. Alternatively, clear coat films may be extruded onto the polymeric substrate 37. The discontinuous layer of indium islands 32 is then added to the clear coat PVDF film 31 to achieve the structure illustrated in FIG. 6. In the next step, a polymer film 42, preferably comprising polyester, is added for the purpose of press polishing the clear coat PVDF film and the discontinuous indium layer 32 in the manner described previously. FIG. 8 illustrates that this polymer film 42 is then removed, thereby leaving the smooth surface of the discontinuous indium layer 32.

Figure 9:
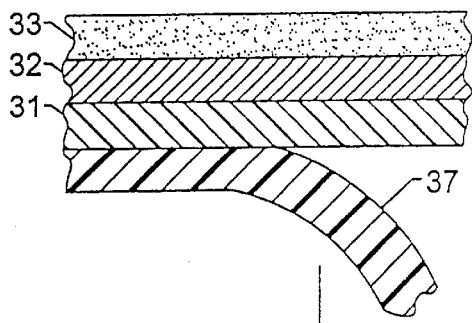
Figure 10:
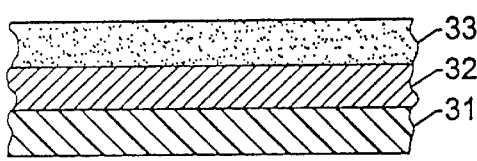
Figure 11:
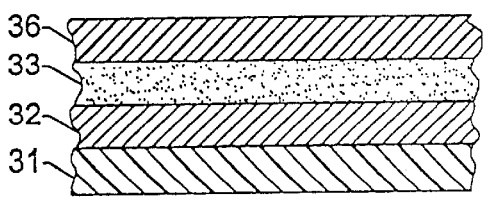
Figure 12:
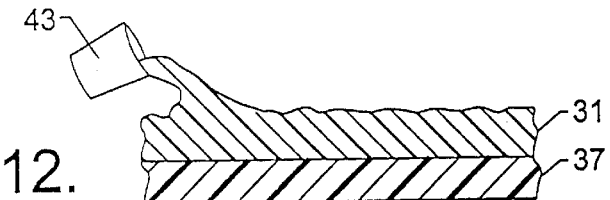
FIGS. 12–16 illustrate another sequence for forming one embodiment of the bright metallized formable film laminate of the present invention.
Figure 13:
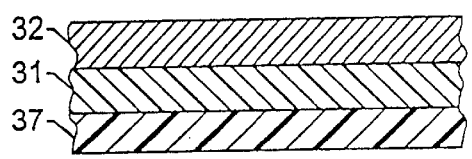

FIG. 9 illustrates the next two steps in which the polymeric substrate 37, upon which the clear coat PVDF film 31 was cast, is removed while the adhesive layer 33 is applied to yield the structure of FIG. 10, which comprises the clear coat PVDF layer 31, the discontinuous indium layer 32, and the adhesive layer 33. FIG. 11 illustrates the final step in the process in which a thermoplastic backing layer 36 is added to the structure. Alternatively, the polymeric substrate 37 may be retained as part of the structure until thermoplastic backing layer 36 is introduced. This not only improves the stability of the intermediate structure, but also protects the clear coat PVDF film 31 from becoming scratched or otherwise marred during conveying and handling processes.

FIGS. 12–16 illustrate a method of making another embodiment of the bright metallized formable laminate of the present invention. As in the previous embodiment, the clear coat PVDF film 31 is cast from a source 43 onto a polymeric substrate 37. Thereafter, a discontinuous indium layer 32 is added to yield the structure of FIG. 13.

Figure 14:
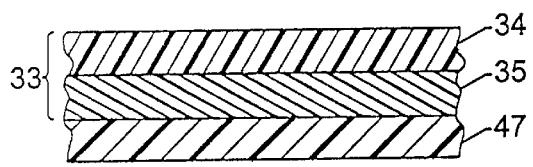
Figure 15:
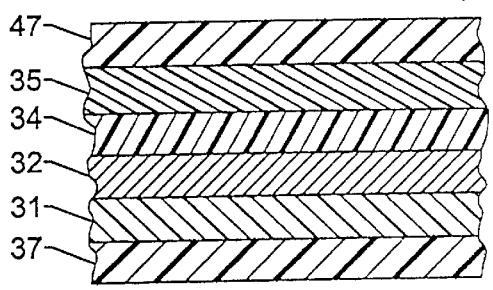
Figure 16:
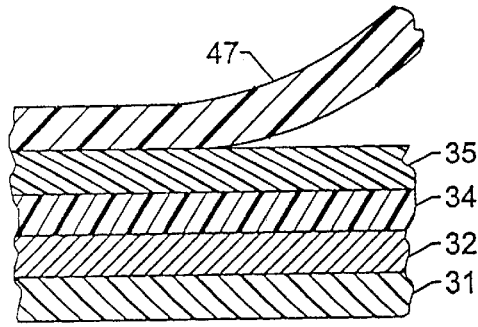
Figure 17:
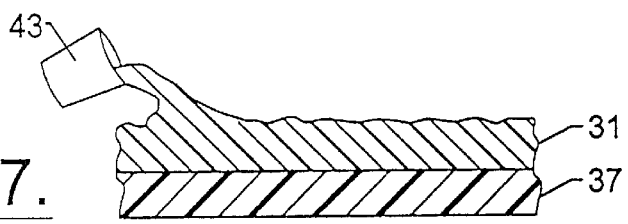
FIGS. 17–25 illustrate yet a third sequence for forming one embodiment of the bright metallized formable film laminate of the present invention.
Figure 18:
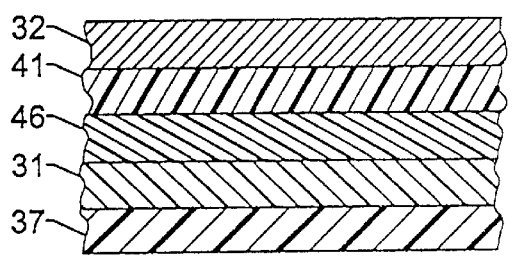

FIG. 14 illustrates the next step in the process in which the adhesive layer 33 is formed by applying the acrylic layer 35 and the polyurethane layer 34 to a polymeric adhesive carrier substrate 47, preferably comprising polyester. As indicated by the looping arrow between FIGS. 14 and 15, this intermediate adhesive structure, which is broadly designated at 50 within FIG. 15, is applied to the structure of FIG. 13 with the polyurethane layer 34 being applied to the discontinuous indium layer 32 to form the structure illustrated in FIG. 15. The polymeric substrate 37 and polymeric adhesive carrier substrate 47 can then be removed (as partially indicated in FIG. 16) to produce the resulting structure.

Figure 19:
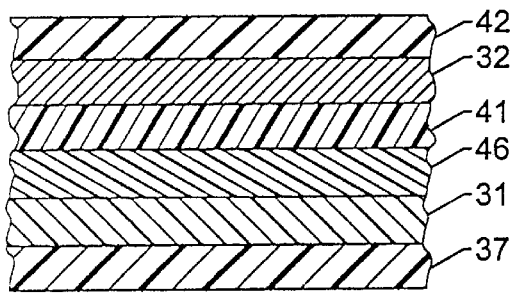
Figure 20:
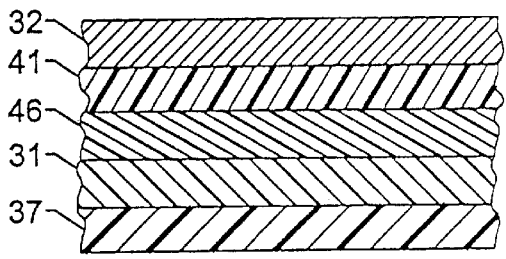
Figure 21:
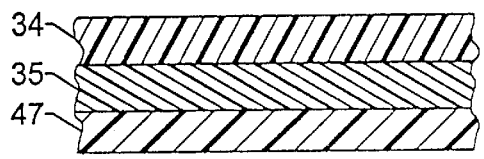
Figure 22:
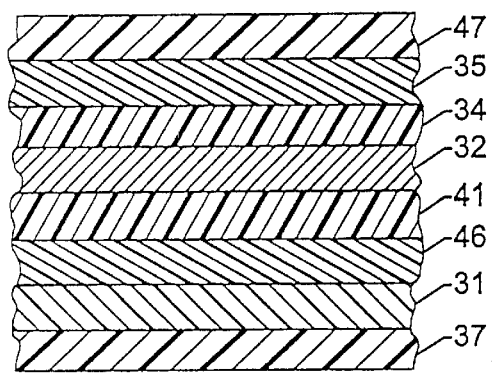
Figure 23:
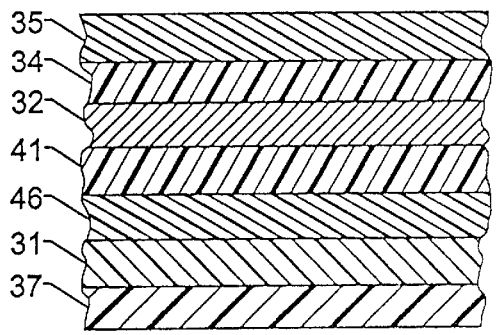
Figure 24:
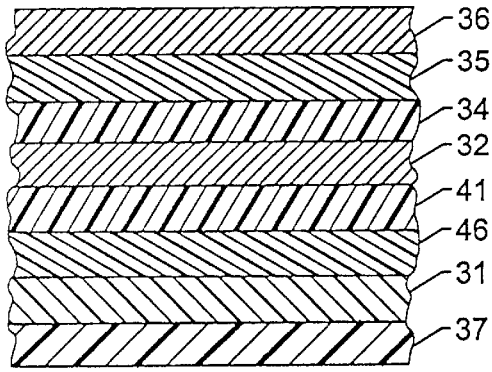
Figure 25:
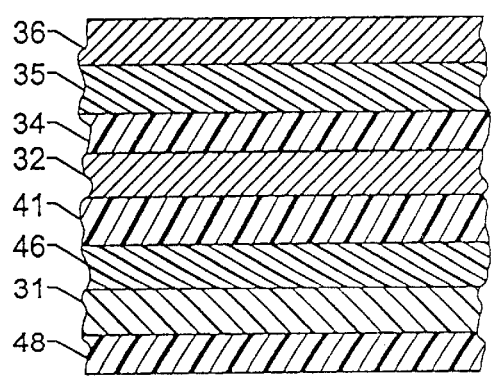

FIGS. 17–25 illustrate yet a third method of producing the bright metallized formable laminate of the present invention. As in the previous two method embodiments, this method initially comprises the step of casting a clear coat PVDF film 31 onto an appropriate polymeric substrate 37, such as a polyester substrate. As illustrated by the progression from FIG. 17 to FIG. 18, however, in this embodiment a primer layer 46, preferably comprising acrylic, and a formable clear coat leveling layer 41, most preferably comprising polyvinyl fluoride or polyurethane, are applied to the clear coat PVDF film 31 before the discontinuous indium layer 32 is added. FIG. 19 illustrates that a polymer film 42 is added to facilitate press polishing. Polymer film 42 is then removed from the structure to result in the structure shown in FIG. 20. FIG. 21 again illustrates that in a separate step, an adhesive layer formed of an acrylic layer 35 and a polyurethane layer 34 on a polymeric adhesive carrier substrate 47 is added to the structure of FIG. 20 to result in the overall structure illustrated in FIG. 22. Removing the polymeric adhesive carrier substrate 47 from the adhesive layer produces the structure illustrated in FIG. 23. Thereafter, a thermoplastic backing layer 36 is added to complete the structure depicted in FIG. 24. The polymeric substrate 37 can be removed as desired before using the metallized laminate. Optionally, the inclusion of an extensible mask layer 48 results in the structure shown in FIG. 25.

In the drawings and specification, typical embodiments of the invention have been disclosed. Specific terms have been used only in a generic and descriptive sense, and not for purposes of limitation. The scope of the invention is set forth in the following claims.

That which is claimed is:

1. A bright metallized formable laminate, comprising:
    a formable, weatherable clear coat film comprising polyvinylidene difluoride;
    a formable clear coat leveling layer on said weatherable clear coat film; and
    a discontinuous layer of indium islands deposited on said formable leveling layer, opposite said weatherable clear coat film.

2. A bright metallized formable laminate according to claim 1, wherein said weatherable clear coat film comprises between about 30 and 90 weight percent polyvinylidene difluoride and between about 10 and 70 weight percent acrylic.

3. A bright metallized formable laminate according to claim 1, wherein said weatherable clear coat film comprises between about 50 and 70 weight percent polyvinylidene difluoride and between about 30 and 50 weight percent acrylic.

4. A bright metallized formable laminate according to claim 1, wherein said weatherable clear coat film comprises about 50 weight percent poly-vinylidene difluoride and about 50 weight percent acrylic.

5. A bright metallized formable laminate according to claim 1, wherein said weatherable clear coat film is a tinted clear coat film.

6. A bright metallized formable laminate according to claim 1, wherein said weatherable clear coat film has a design.

7. A bright metallized formable laminate according to claim 1, wherein said formable leveling layer has a microscopically-smooth surface adjacent to said discontinuous indium layer.

8. A bright metallized formable laminate according to claim 7, wherein the microscopically-smooth surface of said formable leveling layer has a roughness average of about 0.75 micron or less.

9. A bright metallized formable laminate according to claim 1, wherein said formable leveling layer comprises polyvinyl fluoride.

10. A bright metallized formable laminate according to claim 9, wherein said formable leveling layer has a microscopically-smooth surface contiguous to said discontinuous indium layer.

11. A bright metallized formable laminate according to claim 1, wherein said formable leveling layer comprises polyurethane.

12. A bright metallized formable laminate according to claim 1, wherein said formable leveling layer comprises acrylic.

13. A bright metallized formable laminate according to claim 1, wherein said formable leveling layer and said discontinuous indium layer are bonded together at an adhesion strength of at least about two lbs/in.

14. A bright metallized formable laminate according to claim 1, wherein said formable leveling layer is a tinted leveling layer.

15. A bright metallized formable laminate according to claim 1, wherein said formable leveling layer has a design.

16. A bright metallized formable laminate according to claim 1, further comprising a primer layer between said weatherable clear coat film and said formable leveling layer.

17. A bright metallized formable laminate according to claim 16, wherein:
    said primer layer is contiguous to said weatherable clear coat film and said formable leveling layer; and
    said formable leveling layer is contiguous to said primer layer and said discontinuous indium layer.

18. A bright metallized formable laminate according to claim 16, wherein said primer layer comprises an adhesive.

19. A bright metallized formable laminate according to claim 16, wherein said primer layer comprises acrylic.

20. A bright metallized formable laminate according to claim 1, further comprising an adhesive layer on said discontinuous indium layer, opposite said formable leveling layer.

21. A bright metallized formable laminate according to claim 20, wherein said adhesive layer comprises a pressure-sensitive adhesive.

22. A bright metallized formable laminate according to claim 20, wherein said adhesive layer comprises a heat-reactive adhesive.

23. A bright metallized formable laminate according to claim 20, wherein said adhesive layer comprises a crosslinking adhesive.

24. A bright metallized formable laminate according to claim 20, wherein said adhesive layer is a composite adhesive.

25. A bright metallized formable laminate according to claim 20, wherein said adhesive layer comprises polyurethane.

26. A bright metallized formable laminate according to claim 20, wherein said adhesive layer comprises acrylic.

27. A bright metallized formable laminate according to claim 20, wherein said adhesive layer comprises a chlorinated polyolefin.

28. A bright metallized formable laminate according to claim 20, wherein:
    said adhesive layer comprises a polyurethane layer and an acrylic layer; and
    said polyurethane layer of said adhesive layer is positioned between said discontinuous indium layer and said acrylic layer of said adhesive layer.

29. A bright metallized formable laminate according to claim 20, wherein:
    said adhesive layer comprises a polyurethane layer, an acrylic layer, and a chlorinated polyolefin layer;
    said polyurethane layer is positioned between said discontinuous indium layer and said acrylic layer; and
    said acrylic layer is positioned between said polyurethane layer and said chlorinated polyolefin layer.

30. A bright metallized formable laminate according to claim 20, wherein:
    said adhesive layer comprises a layer made of an acrylic/polyurethane blend, and a chlorinated polyolefin layer; and
    said acrylic/polyurethane layer is positioned between said discontinuous indium layer and said chlorinated polyolefin layer.

31. A bright metallized formable laminate according to claim 20, wherein said adhesive layer is a tinted adhesive layer.

32. A bright metallized formable laminate according to claim 20, further comprising a thermoplastic backing layer on said adhesive layer, opposite said discontinuous indium layer.

33. A bright metallized formable laminate according to claim 32, wherein:
   said discontinuous indium layer is contiguous to said formable leveling layer and said adhesive layer; and
   said adhesive layer is contiguous to said discontinuous indium layer and said thermoplastic backing layer.

34. A bright metallized formable laminate according to claim 32, wherein said thermoplastic backing layer comprises acrylonitrile-butadiene-styrene copolymers.

35. A bright metallized formable laminate according to claim 32, wherein said thermoplastic backing layer comprises polyvinyl chloride.

36. A bright metallized formable laminate according to claim 32, wherein said thermoplastic backing layer comprises thermoplastic olefins.

37. A bright metallized formable laminate according to claim 32, wherein said thermoplastic backing layer comprises a thermoplastic selected from the group consisting of polycarbonates, polystyrenes, polyamides, polyethylene, and polypropylene.

38. A bright metallized formable laminate according to claim 32, wherein said thermoplastic backing layer is a tinted thermoplastic backing layer.

39. A bright metallized formable laminate according to claim 32, further comprising a thermoplastic primer layer between said weatherable clear coat film and said formable leveling layer.

40. A bright metallized formable laminate according to claim 1, further comprising an extensible mask layer on said weatherable clear coat film, opposite said formable leveling layer.

41. A part formed from the bright metallized formable laminate of claim 1.

42. A part according to claim 41 that has been formed using a technique selected from the group consisting of injection molding, blow molding, compression molding, thermoforming, and, in-mold forming.

43. A part according to claim 41 that has been formed using a technique selected from the group consisting of vacuum forming and extrusion lamination.

44. A bright metallized formable laminate, comprising:
   a formable, weatherable clear coat film comprising polyvinylidene difluoride and acrylic;
   a primer layer comprising acrylic, said primer layer being contiguous to said weatherable clear coat film;
   a formable clear coat leveling layer comprising polyvinyl fluoride, said formable leveling layer being contiguous to said acrylic primer layer, opposite said weatherable clear coat film, and having a microscopically-smooth surface opposite said acrylic primer layer; and
   a discontinuous layer of indium islands contiguously deposited on said microscopically-smooth surface of said formable leveling layer, opposite said acrylic primer layer.

45. A bright metallized formable laminate according to claim 44, wherein said weatherable clear coat film comprises between about 30 and 90 weight percent polyvinylidene difluoride and between about 10 and 70 weight percent acrylic.

46. A bright metallized formable laminate according to claim 44, wherein said weatherable clear coat film comprises between about 50 and 70 weight percent polyvinylidene difluoride and between about 30 and 50 weight percent acrylic.

47. A bright metallized formable laminate according to claim 44, further comprising:
   an adhesive layer contiguous to said discontinuous indium layer, opposite said formable leveling layer; and
   a thermoplastic backing layer contiguous to said adhesive layer, opposite said discontinuous indium layer.

48. A bright metallized formable laminate according to claim 47, wherein said adhesive layer is selected from the group consisting of pressure-sensitive adhesives, heat-reactive adhesives, crosslinking adhesives, and multicomponent composite adhesives.

49. A bright metallized formable laminate according to claim 47, wherein said adhesive layer comprises an adhesive selected from the group consisting of polyurethanes, acrylics, and chlorinated polyolefins.

50. A bright metallized formable laminate according to claim 47, wherein said thermoplastic backing layer comprises a thermoplastic selected from the group consisting of acrylonitrile-butadiene-styrene copolymers, polyvinyl chloride, and thermoplastic olefins.

51. A bright metallized formable laminate according to claim 47, wherein:
   said weatherable clear coat film comprises between about 30 and 90 weight percent polyvinylidene difluoride and between about 10 and 70 weight percent acrylic;
   said adhesive layer comprises polyurethane; and
   said thermoplastic backing layer comprises a thermoplastic selected from the group consisting of acrylonitrile-butadiene-styrene copolymers, polyvinyl chloride, and thermoplastic olefins.

52. A bright metallized formable laminate according to claim 47, wherein the metallized laminate incorporates a component selected from the group consisting of a tinted weatherable clear coat film, a tinted primer layer, a tinted formable leveling layer, a tinted adhesive layer, and a tinted thermoplastic backing layer.

53. A part formed from the bright metallized formable laminate of claim 44.

54. A bright metallized formable laminate, comprising:
   a formable, weatherable clear coat film comprising polyvinylidene difluoride;
   a formable clear coat leveling layer on said weatherable clear coat film, said formable leveling layer having a microscopically-smooth surface opposite said weatherable clear coat film; and
   a discontinuous layer of indium islands deposited on said microscopically-smooth surface of said formable leveling layer, opposite said weatherable clear coat film.

55. A bright metallized formable laminate according to claim 54, wherein said weatherable clear coat film comprises between about 30 and 90 weight percent polyvinylidene difluoride and between about 10 and 70 weight percent acrylic.

56. A bright metallized formable laminate according to claim 54, wherein said weatherable clear coat film comprises between about 50 and 70 weight percent polyvinylidene difluoride and between about 30 and 50 weight percent acrylic.

57. A bright metallized formable laminate according to claim 54, wherein said microscopically-smooth surface of said formable leveling layer has a roughness average of about 0.75 micron or less.

58. A bright metallized formable laminate according to claim 54, wherein said formable leveling layer comprises polyvinyl fluoride.

59. A bright metallized formable laminate according to claim 54, wherein said formable leveling layer comprises polyurethane or acrylic.

60. A bright metallized formable laminate according to claim 54, wherein said formable leveling layer and said discontinuous indium layer are bonded together at an adhesion strength of at least about two lbs/in.

61. A bright metallized formable laminate according to claim 54, further comprising a primer layer between said weatherable clear coat film and said formable leveling layer.

62. A bright metallized formable laminate according to claim 61, wherein:

said primer layer is contiguous to said weatherable clear coat film and said formable leveling layer; and said formable leveling layer is contiguous to said primer layer and said discontinuous indium layer.

63. A bright metallized formable laminate according to claim 54, further comprising an adhesive layer on said discontinuous indium layer, opposite said formable leveling layer.

64. A bright metallized formable laminate according to claim 63, wherein said adhesive layer is selected from the group consisting of pressure-sensitive adhesives, heat-reactive adhesives, crosslinking adhesives, and multicomponent composite adhesives.

65. A bright metallized formable laminate according to claim 63, wherein said adhesive layer comprises an adhesive selected from the group consisting of polyurethane, acrylics, and chlorinated polyolefins.

66. A bright metallized formable laminate according to claim 63, further comprising a thermoplastic backing layer on said adhesive layer, opposite said discontinuous indium layer.

67. A bright metallized formable laminate according to claim 66, wherein:

said discontinuous indium layer is contiguous to said formable leveling layer and said adhesive layer; and said adhesive layer is contiguous to said discontinuous indium layer and said thermoplastic backing layer.

68. A bright metallized formable laminate according to claim 66, wherein said thermoplastic backing layer comprises a thermoplastic selected from the group consisting of acrylonitrile-butadiene-styrene copolymers, polyvinyl chloride, and thermoplastic olefins.

69. A bright metallized formable laminate according to claim 66, wherein said thermoplastic backing layer comprises a thermoplastic selected from the group consisting of polycarbonates, polystyrenes, polyamides, polyethylene, and polypropylene.

70. A bright metallized formable laminate, comprising:

a formable, weatherable clear coat film comprising between about 30 and 90 weight percent polyvinylidene difluoride and between about 10 and 70 weight percent acrylic;

a formable clear coat leveling layer on said weatherable clear coat film; and a discontinuous layer of indium islands deposited on said formable leveling layer, opposite said weatherable clear coat film.

71. A bright metallized formable laminate according to claim 70, wherein said formable leveling layer and said discontinuous indium layer are bonded together at an adhesion strength of at least about two lbs/in.

72. A bright metallized formable laminate according to claim 70, further comprising a primer layer between said weatherable clear coat film and said formable leveling layer.

73. A bright metallized formable laminate according to claim 70, further comprising an adhesive layer on said discontinuous indium layer, opposite said formable leveling layer.

74. A bright metallized formable laminate according to claim 73, further comprising a thermoplastic backing layer on said adhesive layer, opposite said discontinuous indium layer.

75. A bright metallized formable laminate according to claim 74, wherein the metallized laminate incorporates a component selected from the group consisting of a tinted weatherable clear coat film, a tinted formable leveling layer, a tinted adhesive layer, and a tinted thermoplastic backing layer.

* * * * *